United States Patent
Choi

(10) Patent No.: US 9,292,199 B2
(45) Date of Patent: Mar. 22, 2016

(54) FUNCTION EXECUTION METHOD AND APPARATUS THEREOF

(75) Inventor: Jin-Won Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 742 days.

(21) Appl. No.: 12/557,322

(22) Filed: Sep. 10, 2009

(65) Prior Publication Data

US 2010/0299638 A1    Nov. 25, 2010

(30) Foreign Application Priority Data

May 25, 2009    (KR) .......................... 10-2009-0045595

(51) Int. Cl.
G06F 3/0488    (2013.01)

(52) U.S. Cl.
CPC .......... *G06F 3/04886* (2013.01); *G06F 3/0488* (2013.01); *G06F 3/04883* (2013.01)

(58) Field of Classification Search
CPC .............. G06F 3/0481; G06F 3/04812; G06F 3/04817; G06F 3/0488; G06F 3/04883; G06F 3/04886
USPC .................. 715/835, 863, 810–834, 836–845
See application file for complete search history.

(56) References Cited

U.S. PATENT DOCUMENTS

| | | | | |
|---|---|---|---|---|
| 5,010,500 A | * | 4/1991 | Makkuni et al. .............. | 715/863 |
| 5,612,719 A | * | 3/1997 | Beernink ............ | G06F 3/04883 345/172 |
| 5,689,667 A | * | 11/1997 | Kurtenbach .................. | 715/810 |
| 6,094,197 A | * | 7/2000 | Buxton et al. ................. | 715/863 |
| 6,262,724 B1 | * | 7/2001 | Crow et al. .................... | 715/723 |
| 6,958,749 B1 | * | 10/2005 | Matsushita et al. ........... | 345/175 |
| 7,058,902 B2 | * | 6/2006 | Iwema et al. .................. | 715/810 |
| 7,158,123 B2 | * | 1/2007 | Myers et al. .................. | 345/173 |
| 7,743,348 B2 | * | 6/2010 | Robbins et al. ............... | 715/863 |
| 2003/0016253 A1 | * | 1/2003 | Aoki et al. ..................... | 345/863 |
| 2003/0025676 A1 | * | 2/2003 | Cappendijk ................... | 345/173 |
| 2003/0071855 A1 | * | 4/2003 | Kim .............................. | 345/810 |
| 2004/0021647 A1 | * | 2/2004 | Iwema et al. .................. | 345/179 |
| 2004/0032400 A1 | * | 2/2004 | Freeman et al. .............. | 345/173 |
| 2004/0150668 A1 | * | 8/2004 | Myers et al. .................. | 345/771 |
| 2005/0007616 A1 | * | 1/2005 | Sugiyama et al. ........... | 358/1.13 |
| 2006/0001650 A1 | * | 1/2006 | Robbins et al. ............... | 345/173 |
| 2006/0026535 A1 | * | 2/2006 | Hotelling et al. ............. | 715/863 |
| 2006/0181519 A1 | * | 8/2006 | Vernier et al. ................ | 345/173 |
| 2006/0244735 A1 | * | 11/2006 | Wilson .......................... | 345/173 |

(Continued)

FOREIGN PATENT DOCUMENTS

JP    2007-316732 A    12/2007
KR    10-0848272 B1    7/2008

*Primary Examiner* — Amy Ng
*Assistant Examiner* — William Wong
(74) *Attorney, Agent, or Firm* — Birch, Stewart, Kolasch & Birch, LLP

(57) ABSTRACT

A function execution method and apparatus thereof for displaying one or more sub-functions included in a function selected by a first touch on a trace according to a second touch input based upon the first and the second touches inputted with a timing difference, and executing the relevant sub-function selected among the displayed one or more sub-functions. For this purpose, a function execution method according to the present invention is performed by comprising: detecting a first touch input touched on a display unit; detecting a drag created by a second touch inputted while maintaining the first touch; and displaying one or more sub-functions included in a function selected by the first touch along a trace of the detected drag on the display unit.

12 Claims, 16 Drawing Sheets

(56) References Cited

U.S. PATENT DOCUMENTS

| | | | |
|---|---|---|---|
| 2006/0284852 A1* | 12/2006 | Hofmeister et al. | 345/173 |
| 2007/0192749 A1* | 8/2007 | Baudisch | 715/863 |
| 2007/0236468 A1* | 10/2007 | Tuli | 345/173 |
| 2007/0236476 A1* | 10/2007 | Suzuki | 345/173 |
| 2007/0277125 A1* | 11/2007 | Shin et al. | 715/863 |
| 2008/0036743 A1* | 2/2008 | Westerman et al. | 345/173 |
| 2008/0074399 A1* | 3/2008 | Lee | 345/173 |
| 2008/0168403 A1* | 7/2008 | Westerman et al. | 715/863 |
| 2008/0195961 A1* | 8/2008 | Bae et al. | 715/769 |
| 2008/0204402 A1* | 8/2008 | Hirata et al. | 345/156 |
| 2008/0297482 A1* | 12/2008 | Weiss | G06F 3/04883 345/173 |
| 2009/0007017 A1* | 1/2009 | Anzures et al. | 715/835 |
| 2009/0019401 A1* | 1/2009 | Park et al. | 715/841 |
| 2009/0027337 A1* | 1/2009 | Hildreth | 345/158 |
| 2009/0058822 A1* | 3/2009 | Chaudhri | 345/173 |
| 2009/0109187 A1* | 4/2009 | Noma | 345/173 |
| 2009/0125845 A1 | 5/2009 | Lacock et al. | |
| 2009/0158152 A1* | 6/2009 | Kodimer et al. | 715/708 |
| 2009/0167702 A1* | 7/2009 | Nurmi | 345/173 |
| 2009/0174679 A1* | 7/2009 | Westerman | 345/173 |
| 2009/0183100 A1* | 7/2009 | Eom et al. | 715/769 |
| 2009/0247234 A1* | 10/2009 | Kim | 455/566 |
| 2009/0278806 A1* | 11/2009 | Duarte et al. | 345/173 |
| 2009/0315848 A1* | 12/2009 | Ku et al. | 345/173 |
| 2009/0327964 A1* | 12/2009 | Mouilleseaux et al. | 715/834 |
| 2010/0053111 A1 | 3/2010 | Karlsson | |
| 2010/0083111 A1* | 4/2010 | De Los Reyes | 715/702 |
| 2010/0083190 A1* | 4/2010 | Roberts et al. | 715/863 |
| 2010/0095240 A1* | 4/2010 | Shiplacoff et al. | 715/784 |
| 2010/0146425 A1* | 6/2010 | Lance et al. | 715/769 |
| 2010/0201634 A1* | 8/2010 | Coddington | 345/173 |
| 2010/0235793 A1* | 9/2010 | Ording et al. | 715/863 |
| 2010/0283744 A1* | 11/2010 | Nordenhake et al. | 345/173 |
| 2011/0061021 A1* | 3/2011 | Kang et al. | 715/800 |

* cited by examiner

FUNCTION EXECUTION METHOD AND APPARATUS THEREOF

CROSS-REFERENCE TO RELATED APPLICATION

The present application claims priority to Korean Application No. 10-2009-0045595 filed in Korea on May 25, 2009, which is herein expressly incorporated by reference in its entirety.

BACKGROUND OF THE INVENTION

1. Field of the Invention

The present invention relates to a telematics function execution method and apparatus thereof.

2. Description of the Related Art

A function execution apparatus is a device for executing the relevant function selected by a user through a keyboard, mouse, keypad, or touch screen. A conventional function execution device may include telematics functions. However, conventional devices have limited user interface capabilities.

SUMMARY OF THE INVENTION

The present invention includes an apparatus and method for performing the steps of selecting a function by detecting a first touch to a display unit of a display device; detecting a first drag created by a second touch to the display unit while maintaining the first touch; and displaying, on or near a trace of the detected first drag, an icon of a sub-function associated with the function.

The present invention also includes an apparatus having a display unit; a touch detector; and a controller operatively connected to the display unit and touch detector, the controller configured to select a function by detecting a first touch to the display unit, detect a first drag created by a second touch to the display unit while maintaining the first touch, and display, on or near a trace of the detected first drag, an icon of a sub-function associated with the function.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
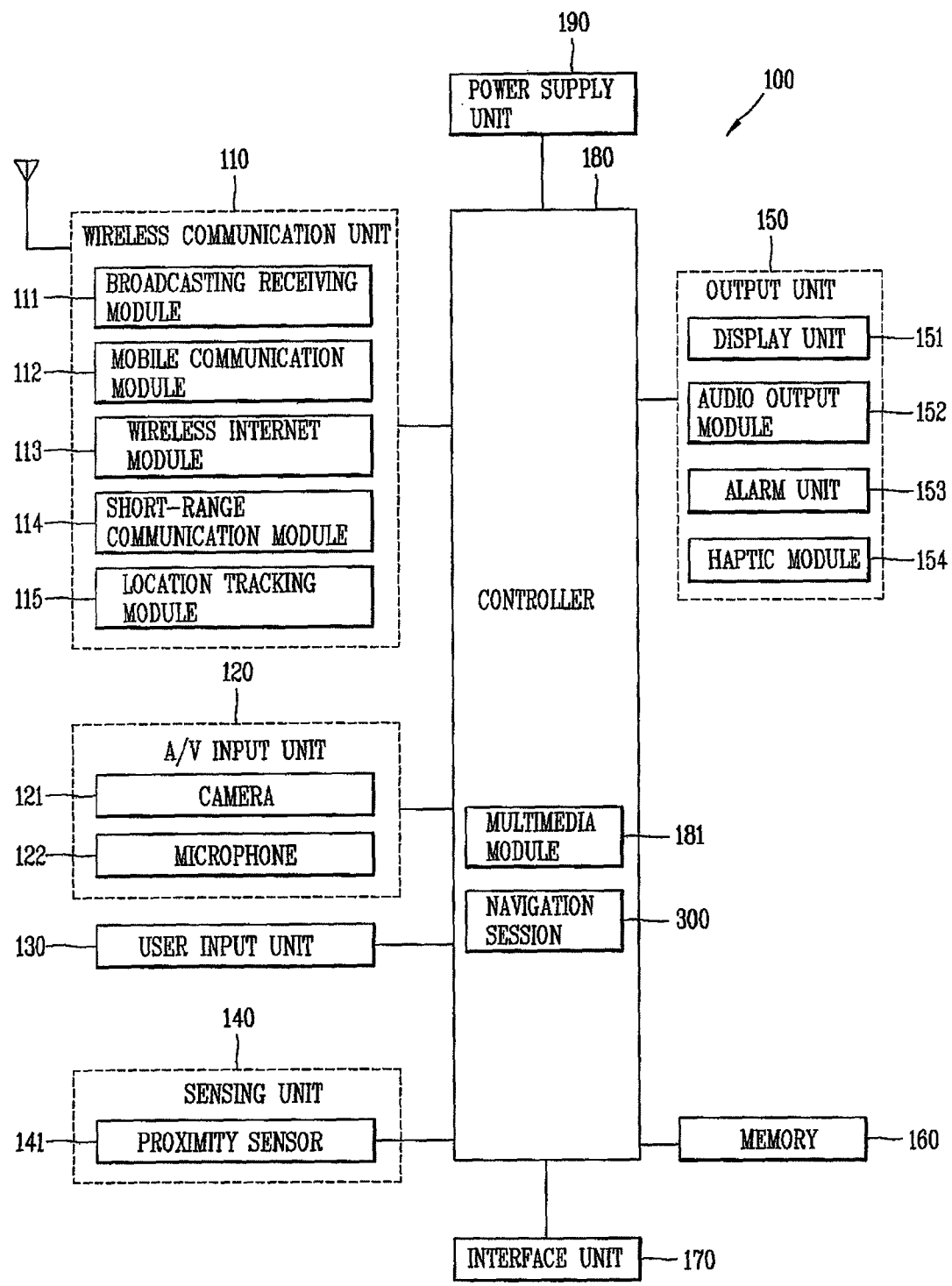
FIG. 1 is a block diagram of a mobile terminal for describing a function execution apparatus according to an embodiment of the present invention.

Hereinafter, preferred embodiments according to the present invention will be described in detail with reference to the accompanying drawings, but the same reference numerals are designated for the same or corresponding element irrespective of the drawing marks, and the duplicated explanation will be omitted.

FIG. 1 is a block diagram illustrating a configuration of a mobile terminal 100 for describing a function execution apparatus according to an embodiment of the present invention.

The mobile terminal 100 may be implemented in various forms. For example, the mobile terminal 100 may include a portable terminal, a smart phone, a notebook computer, a digital multimedia broadcasting terminal, a Personal Digital Assistant (PDA), a Portable Multimedia Player (PMP), a navigation (vehicle navigation device), and the like.

As illustrated in FIG. 1, the mobile terminal 100 may include a wireless communication unit 110, an A/V (Audio/Video) input unit 120, an user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

The wireless communication unit 110 may include one or more components allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location tracking module 115, and the like.

The broadcast receiving module 111 receives broadcast signals and/or broadcast associated information from an external broadcast management server via a broadcast channel. The broadcast channel may include a satellite channel and/or a terrestrial channel. The broadcast management server may indicate a server that generates and transmits a broadcast signal and/or broadcast associated information or a server that receives a previously generated broadcast signal and/or broadcast associated information and transmits to the mobile terminal 100. The broadcast associated information may indicate information regarding a broadcast channel, a broadcast program, a broadcast service provider, and the like. The broadcast signal may include a TV broadcast signal, a radio broadcast signal and a data broadcast signal, and the like. Also, the broadcast signal may further include a data broadcast signal combined with a TV or radio broadcast signal.

In addition, the broadcast associated information may be provided via a mobile communication network, and in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive a broadcast signal by using various types of broadcast systems. In particular, the broadcast receiving module 111 may receive a digital broadcast signal by using a digital broadcast system such as the digital multimedia broadcasting-terrestrial (DMB-T) system, the digital multimedia broadcasting-satellite (DMB-S) system, the media forward link only (MediaFLO™) system, the digital video broadcast-handheld (DVB-H) system, the integrated services digital broadcast-terrestrial (ISDB-T) system, and the like. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives a radio signal to and/or from at least one of a base station, an external terminal and a server on a mobile communication network. The radio signal may include a voice call signal, a video call signal and/or various types of data according to text and/or multimedia message transmission and/or reception.

The wireless Internet module 113 supports wireless Internet access for the mobile terminal 100. The wireless Internet module 113 may be internally or externally coupled to the mobile terminal 100. The wireless Internet access technique may include a Wireless LAN (WLAN), Wi-Fi™, Wireless Broadband (WiBro™), World Interoperability for Microwave Access (WiMax™), High Speed Downlink Packet Access (HSDPA), and the like.

The short-range communication module 114 is a module for supporting a short-range communication. Suitable technologies for implementing this module may include Bluetooth™, Radio Frequency IDentification (RFID), Infrared Data Association® (IrDA®), Ultra WideBand (UWB), ZigBee™, and the like.

The location tracking module 115 is a module for detecting or acquiring a location of the mobile terminal. An example of the location tracking module 115 may include a Global Positioning System (GPS) module. The GPS module receives location information from a plurality of satellites. Further, the location information may include coordinate information represented by a latitude and longitude. For example, the GPS module may measure an accurate time and distance respectively from more than three satellites so as to accurately calculate a current location of the mobile terminal 100 based on such three different distances according to a triangulation scheme. A scheme may be used to obtain time information and distance information from three satellites and correct error by one satellite. In particular, the GPS module can further obtain three-dimensional speed information and an accurate time, as well as the location of the latitude, longitude and altitude from the location information received from the satellites. As the location tracking module 115, a Wi-Fi™ Positioning System and/or a Hybrid Positioning System may also be used.

The A/V (audio/video) input unit 120 is configured to provide an audio or video signal input to the mobile terminal 100. The A/V input unit 120 may include a camera 121 and a microphone 122. The camera 121 receives and processes image frames of still pictures or video obtained by an image sensor (or an image capture device) in a video phone call or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration type and/or use environment of the mobile terminal.

The microphone 122 receives an external audio signal via a microphone in a phone call mode, a recording mode, a voice recognition mode, and the like, and processes the audio signal into electrical voice data. The processed voice data may be converted and outputted into a format that is transmittable to a mobile communication base station via the mobile communication module 112 in the phone call mode. The microphone 122 may implement various types of noise canceling (or suppression) algorithms to cancel (or suppress) noise generated in the course of receiving the external audio signal.

The user input unit 130 may generate input data for controlling the operation of the mobile terminal. The user input unit 130 may be include a keypad, a dome switch, a touch pad (e.g., a touch sensitive member that detects changes in resistance, pressure, capacitance, etc. due to being contacted), a jog wheel, a jog switch, and the like.

The sensing unit 140 detects a current status of the mobile terminal 100 such as an opened or closed state of the mobile terminal 100, a location of the mobile terminal 100, a presence or absence of user contact with the mobile terminal 100, an orientation of the mobile terminal 100, an acceleration or deceleration movement of the mobile terminal 100, and the like, and generates a sensing signal for controlling the operation of the mobile terminal 100. For example, when the mobile terminal 100 is a slide phone type, the sensing unit 140 may sense whether a sliding portion of the mobile terminal 100 is open or closed. Other examples include the sensing unit 140 sensing the presence or absence of power provided by a power supply unit 190, the presence or absence of a coupling or other connection between an interface unit 170 and an external device, etc. The sensing unit 140 may also include a proximity sensor 141.

The output unit 150 is configured to output audio signal (or hearing sense related signal), video signal (or visual sense related signal), alarm signal, or tactile-related signal. The output unit 150 may include the display unit 151, an audio output module 152, an alarm unit 153, a haptic module 154, and the like.

The display unit 151 may display (or output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of the components of the display unit 151 may be configured to be a transparent or optical transparent type to allow viewing of the exterior. These components may be called 'transparent display'. A representative example of the transparent display may include a Transparent OLED (TOLED), and the like. The rear surface of the display unit 151 may also be implemented to be optically transparent. Under this configuration, the user can see an object which is located in the rear side of a terminal body through a region occupied by the display unit 151 of the terminal body.

The display unit 151 may be implemented in two or more in number according to a configured aspect of the mobile terminal 100. For instance, a plurality of the display unit 151 may be arranged on one surface in a spacing manner or in an integrated manner, or may be arranged on different surfaces.

Here, when the display unit 151 and a sensor for detecting a touch operation (referred to as the 'touch sensor', hereinafter) are formed with a interlayer structure (referred to as the 'touch screen', hereinafter), the display unit 151 may be also used as an input device as well as an output device. The touch sensor may be configured in a form of, for example, a touch film, a touch sheet, a touch pad, a touch panel, or the like.

The touch sensor may be configured to convert a change of a pressure applied to a specific part of the display unit 151 or a change of a capacitance generated on a specific part of the display unit 151 into an electrical input signal. The touch sensor may be configured to detect a touch input pressure as well as a touch input position and a touch input area. When there is a touch input with respect to the touch sensor the corresponding signal (or signals) is sent to a touch controller (not shown). The touch controller processes the signal (or signals) and then transmits the corresponding data to a controller 180. Accordingly, the controller 180 may sense a touched region of the display unit 151.

The proximity sensor 141 may be arranged at an inner region of the mobile terminal 100 surrounded by a touch screen or may be arranged adjacent to the touch screen. The proximity sensor 141 is a sensor for detecting the presence or absence of an object approaching to a certain detection surface or an object that exists nearby by using the force of electromagnetism or infrared rays without a mechanical contact. The proximity sensor 141 has a considerably longer life span compared with a contact type sensor, and it can be utilized for various purposes.

The proximity sensor 141 may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and the like. When the touch screen is implemented as a capacitance type, the proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen, although the pointer is not actually brought into contact with the touch screen, will be called a "proximity touch", while recognition of actual contacting of the pointer on the touch screen will be called a "contact touch". The position where the pointer is proximately touched on the touch screen indicates a position where the pointer is positioned to correspond vertically to the touch screen when the pointer is proximately touched.

The proximity sensor 141 may detect a proximity touch, and a proximity touch pattern (e.g., a proximity touch distance, a proximity touch direction, a proximity touch speed, a proximity touch time, a proximity touch position, a proximity touch movement state, or the like). Information corresponding to the detected proximity touch operation and the proximity touch pattern may be output onto the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may output an audio signal related to the function performed by the mobile terminal 100 (e.g., a call signal reception sound, a message reception sound, etc.). The audio output module 152 may include a receiver, a speaker, a buzzer, and the like.

The alarm unit 153 may output a signal notifying the user about an occurrence of events in the mobile terminal 100. Examples of the event occurred in the mobile terminal 100 may include a call signal reception, a message reception, a key signal input, a touch input, and the like. In addition to an audio or video output, the alarm unit 153 may output a signal in a different manner to notify the occurrence of an event. For example, the alarm unit 153 may output in a form of vibration. When a call signal or message is received, the alarm unit 153 may vibrate the mobile terminal 100 through vibration means. When a key signal is inputted, the alarm unit 153 may vibrate the mobile terminal 100 through vibration means using a feedback to the key signal input. The user can then recognize an occurrence of the events through vibration as described above. A signal for notifying an occurrence of the event may be outputted via the display unit 151 or the audio output module 152, so the display unit 151 and the audio output module 152 may be classified as part of the alarm unit 153.

The haptic module 154 generates various tactile effects the user may feel. A typical example of the tactile effects generated by the haptic module 154 is vibration. Intensity, pattern, or the like, generated by the haptic module 154 can be controlled. For example, different vibrations may be combined to be outputted or sequentially outputted.

The haptic module 154, in addition to vibration, may generate various other tactile effects such as an effect by stimulation such as a pin arrangement vertically moving with respect to the contacted skin surface, a spray force or suction force of air through a jet orifice or a suction opening, a brush (or contact) with respect to the skin surface, a contact of an electrode, electrostatic force, or the like, or an effect by reproduction of thermal sense using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, a message, a still image, a video, and the like) that are inputted and/or outputted. The memory 160 may store data regarding various patterns of the vibration and audio signal outputted when a touch is inputted to the touch screen.

The memory 160 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disk, an optical disk, and the like. Also, the mobile terminal 100 may operate in relation to a web storage that performs the storage function of the memory 160 over the Internet, or operate in association with the web storage.

The interface unit 170 serves as an interface with an external device connected with the mobile terminal 100. For example, the interface unit 170 may include a wired or wireless headset port, an external charger port, a wired or wireless data port, a memory card port, ports for connecting a device having an identification module, an audio input/output (I/O) port, an video input/output (I/O) port, an earphone port, and the like. The identification module may be a chip (or other element with memory or storage capabilities) that stores various information for authenticating user's authority for using the mobile terminal 100 and, may include a user identity module (UIM), a subscriber identity module (SIM), a universal subscriber identity module (USIM), and the like. In addition, the device having the identification module (referred to as the 'identifying device', hereinafter) may take the form of smart card. Accordingly, the identifying device may be connected with the mobile terminal 100 via a port or other connection device. The interface unit 170 may be used to receive data or power from an external device and transfer the received data or power to one or more elements within the mobile terminal 100 or may be used to transfer data within the mobile terminal to an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal 100 therethrough. Various command signals or power inputted from the cradle may operate as a signal for recognizing when the mobile terminal is properly mounted on the cradle.

The controller 180 typically controls a general operation of the mobile terminal 100. For example, the controller 180 performs a controlling and processing operation associated with a voice call, a data communication, a video phone call, and the like. In addition, the controller 180 may include a multimedia module 181 for reproducing multimedia content. The multimedia module 181 may be configured within the controller 180 or may be configured to be separate from the controller 180.

The controller 180 may perform a pattern recognition processing to recognize a handwriting input or a picture-drawing input performed on the touch screen as characters or images, respectively.

The power supply unit 190 receives external or internal power and supplies the appropriate power required for operating respective elements and components under the control of the controller 180.

Various embodiments applied to the mobile terminal 100 may be implemented in a computer-readable medium using software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180. For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180. In addition, a navigation session 300 applied to the mobile terminal 100 may provide typical navigation functions.

The controller 180 applied to the mobile terminal 100 according to an embodiment of the present invention allows to display one or more sub-functions included in a function selected by a first touch input on a trace according to a second touch input, execute the selected relevant sub-function of the displayed one or more sub-functions, and display the execution result.

Figure 2:
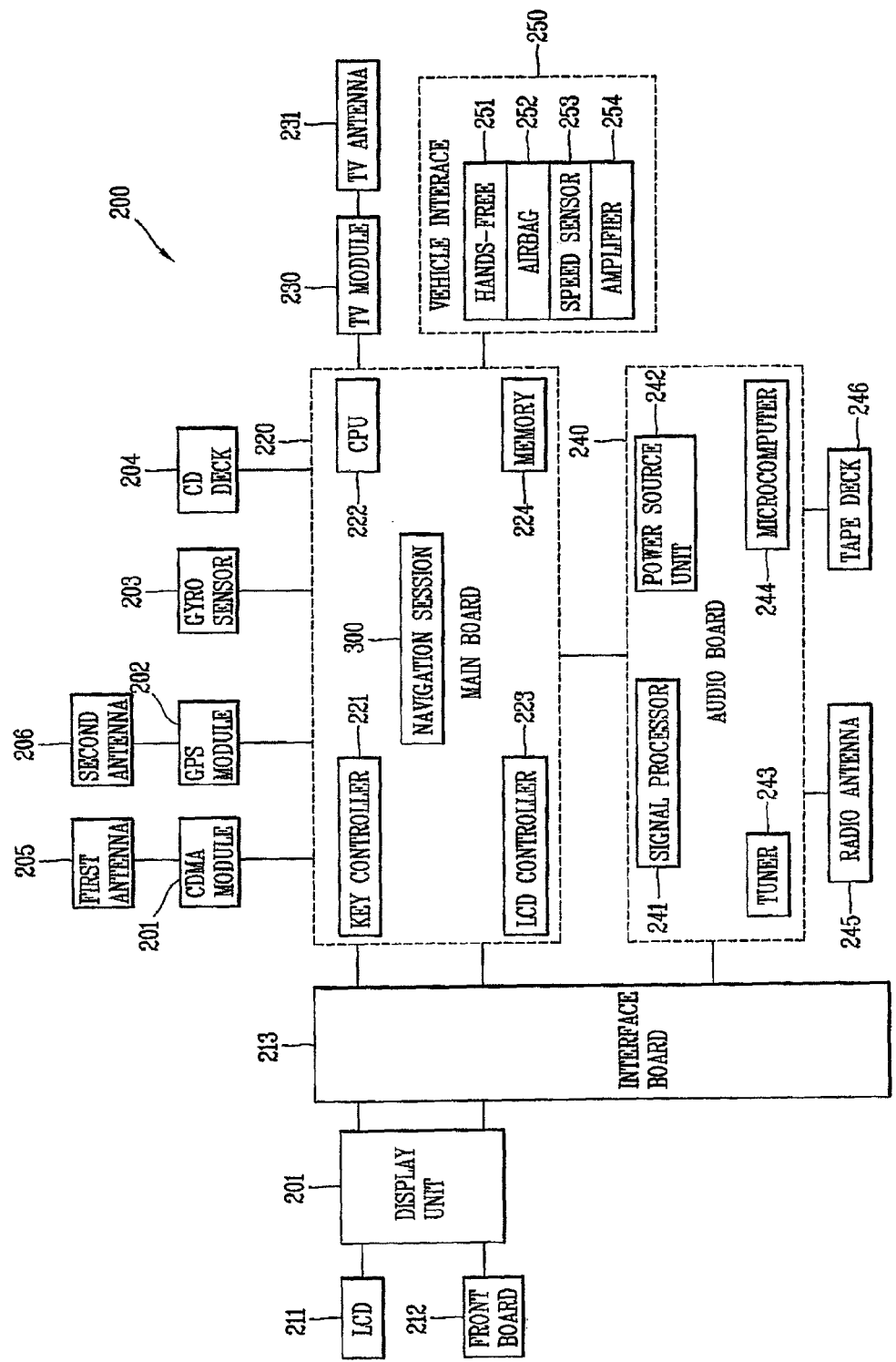
FIG. 2 is a block diagram of a telematics terminal for describing a function execution apparatus according to an embodiment of the present invention.

FIG. 2 is a block diagram illustrating a configuration of a telematics terminal 200 according to an embodiment of the present invention.

Referring to FIG. 2, the telematics terminal 200 may include a main board 220. The main board 220 includes a key controller 221 for controlling a variety of key signals, a central processing unit (CPU) 222 for controlling overall operation of the telematics terminal 200, an LCD controller 223 for controlling an LCD, and a memory 224 for storing each kind of information.

The memory 224 stores map information (map data) for displaying vehicle guidance information (road guidance information for the user while driving or not driving) on a map of the display unit (or LCD 211).

In addition, the memory 224 stores an algorithm for controlling traffic information collection for enabling an input of traffic information depending on a road condition in which a vehicle is currently traveling, and each kind of information for controlling the telematics terminal 200 such an algorithm.

The main board 220 may include a communication module 201 provided with a uniquely given device number, and performing a voice call and data transmission and/or reception through a mobile terminal built in a vehicle, a GPS module 202 for receiving a GPS signal to guide a position of a vehicle, track a traveling route from a depart point to an arrival point, etc., and for generating current position data of a vehicle based on the received GPS signal, or transmitting traffic information collected by a user as a GPS signal; a gyro sensor 203 for sensing a running direction of the vehicle; a CD deck 204 for reproducing a signal recorded on a compact disk (CD); and the like.

The communication module 201 and the GPS module 202 transmit and/or receive signals through a first antenna 205 and a second antenna 206, respectively.

The main board 220 is connected to a TV module 230 for receiving a broadcast signal via a broadcast signal antenna (or TV antenna 231).

The main board 220 is connected to a display unit (liquid crystal display, LCD) 211 controlled by the LCD controller 223 via an interface board 213.

The LCD 211 processes a broadcasting signal received through the TV module 230 through predetermined processes, and then displays the processed broadcasting signal, in the form of a video signal, on the LCD 211 via the interface board 213 under control of the LCD controller 223. In addition, the LCD 211 outputs an audio signal through an amplifier 254 under control of an audio board 240 and displays each kind of video signals, or text signals based on control signals by the LCD controller 223. As discussed above, the LCD 211 may also be configured to receive an input from a user in a touch screen manner.

The LCD 211 may be configured to receive an input from the user in a touch screen method.

In addition, the main board 220 is connected to a front board 212 controlled by the key controller 221 via the interface board 213. The front board 212 configures buttons (or keys) and menus for enabling an input of a variety of key signals, and provides a key signal corresponding to the key (or button) selected by the user to the main board 220. The front board 212 may be provided with a menu key for allowing a direct input of traffic information, and the menu key may be configured to be controlled by the key controller 221.

The audio board 240 is connected to the main board 220, and processes a variety of audio signals. The audio board 240 may include a microcomputer 244 for controlling the audio board 240, a tuner 243 for receiving a radio signal through an antenna (or radio antenna) 245, a power supply unit 242 for supplying power to the microcomputer 244, and a signal processing unit 241 for processing a variety of voice signals.

The audio board 240 is connected to a radio antenna 245 for receiving radio signals, and a tape deck 246 for reproducing an audio tape.

The audio board 240 is connected to an amplifier 254 for outputting audio signals that are signal-processed in the audio board 240.

The amplifier 254 is connected to a vehicle interface 250. That is, the main board 220 and the audio board 240 are connected to the vehicle interface 250. A hands-free 251 for inputting an audio signal without the user having to use their hands to input information, an airbag 252 for providing passenger's safety, a speed sensor 253 for sensing a vehicle speed, and the like are also included in the vehicle interface 250.

In addition, the speed sensor 253 calculates a vehicle speed, and provides information relating to the calculated vehicle speed to the central processing unit 222.

The functions of the navigation session 300 applied to the telematics terminal 200 include general navigation functions such as providing driving directions to a user.

The central processing unit 222 applied to the telematics terminal 200 according to an embodiment of the present invention allows to display one or more sub-functions included in a function selected by a first touch input on a trace according to a second touch input, execute the selected relevant sub-function of the displayed one or more sub-functions, and display the execution result.

Hereinafter, a configuration of a function execution apparatus according to an embodiment of the present invention will be described with reference to FIG. 3. Here, the function execution apparatus is applicable to various terminals for using any function execution apparatus such as smart phone, portable terminal, mobile terminal, personal digital assistant (PDA), notebook computer, WiBro terminal, Internet protocol television (IPTV) terminal, television, telematics terminal, navigation terminal, audio video navigation terminal, and the like.

Figure 3:
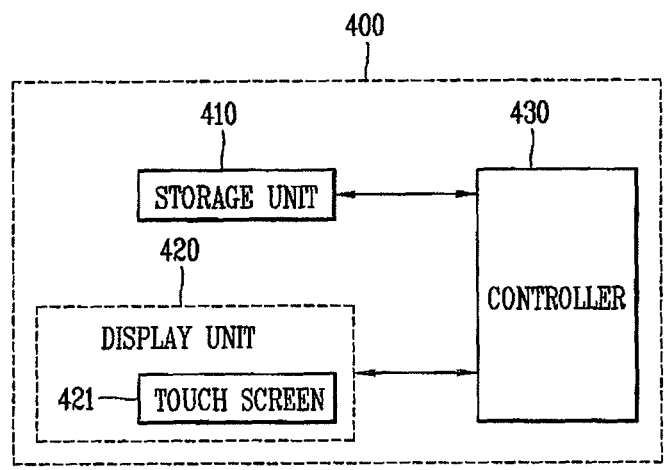
FIG. 3 is a block diagram of a function execution apparatus according to an embodiment of the present invention.

FIG. 3 is a block diagram illustrating a configuration of a function execution apparatus according to an embodiment of the present invention.

As shown in FIG. 3, the function execution apparatus 400 comprises a storage unit 410, a display unit 420, and a controller 430.

The storage unit 410 stores various kinds of menu screens, various user interfaces (UIs), and/or graphic user interfaces (GUIs).

In addition, the storage unit 410 stores data, programs, and the like, required for operating the function execution apparatus 400.

The display unit 420 may include a touch screen. A touch sensor constituting the touch screen may be configured in a form of a touch film, a touch sheet, a touch pad, a touch panel, or the like.

The touch sensor may be configured to convert a change of a pressure applied to a specific part of the display unit 420 or a change of a capacitance generated on a specific of the display unit 420 into an electrical input signal. The touch sensor may be configured to detect a touch input pressure as well as a touch input position and a touch input area. When there is a touch input with respect to the touch sensor the corresponding signal (or signals) is sent to a touch controller (not shown). The touch controller processes the signal (or signals) and then transmits the corresponding data to a controller 430. Accordingly, the controller 430 may sense a touched region of the display unit 420.

In addition, the display unit 420 may include a proximity sensor. The proximity sensor may be arranged at an inner region of the function execution apparatus 400 surrounded by a touch screen or may be arranged adjacent to the touch screen.

The proximity sensor may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and the like. When the touch screen is implemented as a capacitance type, the proximity of a pointer to the touch screen is sensed by changes of an electromagnetic field. In this case, the touch screen (touch sensor) may be categorized into a proximity sensor.

The proximity sensor may detect a proximity touch, and a proximity touch pattern (e.g., a proximity touch distance, a proximity touch direction, a proximity touch speed, a proximity touch time, a proximity touch position, a proximity touch movement state, or the like). Information corresponding to the detected proximity touch operation and the proximity touch pattern may be output onto the touch screen.

The controller 430 senses (or detects) a first touch touched (inputted) by the user among any user interface screens and/or graphic user interface screens displayed on the display unit 420.

The controller 430 senses a second touch by the user while maintaining the first touch sensing. At this time, after sensing the second touch, the controller 430 additionally senses a drag created by the second touch.

The controller 430 senses a trace, moving direction, and the like, of the drag created by the sensed second touch.

In addition, when detecting the first or the second touch, the controller 430 may be configured to detect a touch created by using the user's finger, a stylus pen, a touch pen, and the like.

The controller 430 displays one or more sub-functions included in a function selected by the first touch input (including a menu, a shortcut icon of the specific application program, and the like). At this time, when total number of the sub-functions included in the selected function is N (N>1), the number of sub-functions displayed on a trace of the drag created by the second touch is M, and N>M, in other words, when all sub-functions included in the function are not displayed and some of the sub-functions are only displayed on the display unit 420, then the controller 430 may display a preset first identifier on part of a trace created by the drag (for example, an end portion of the drag moving direction) to indicate that the remaining non-displayed sub-functions among the all sub-functions are present (or remained). At this time, the preset first identifier may be an icon (including an arrow shape, a button shape, a scroll shape, or the like), an emoticon, a user or graphic user interface screen, and the like. The sub-functions may be displayed while the drag is detected (e.g., unveiling/revealing the sub-functions by the drag), immediately after the drag is detected, or a predetermined time after the drag is detected.

When any one of the sub-functions displayed on a trace of the drag created by the second touch includes an additional sub-function, then the controller 430 may display a preset second identifier on part of at least any one sub-function including the additional sub-function. At this time, the preset second identifier may be an icon (including an arrow shape, a button shape, a scroll shape, or the like), an emoticon, a user or graphic user interface screen, and the like.

When any one sub-function is selected among the one or more sub-functions displayed on a trace of the drag created by the second touch, then the controller 430 controls to execute the selected sub-function, and display the function execution result on the display unit 420.

When a second touch input is not detected within a preset time period, then the controller 430 may deactivate the function activated by the first touch input.

When an input for selecting the sub-function displayed on the display unit 420 is not detected within a preset time period, then the controller 430 may deactivate the function activated by the first touch input, and controls not to display the sub-function displayed on the display unit 420.

Hereinafter, a function execution method according to the present invention will be described in detail with reference to FIGS. 1 to 9.

Figure 4:
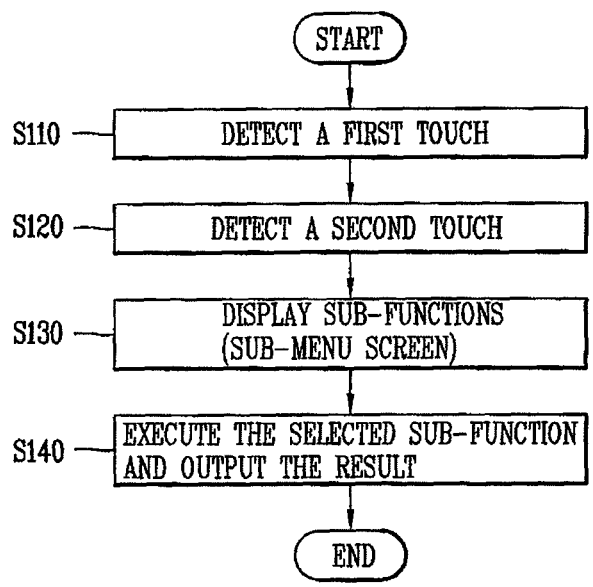
FIG. 4 is a flow chart of a function execution method according to a first embodiment of the present invention.

FIG. 4 is a flow chart illustrating a function execution method according to a first embodiment of the present invention.

First, the controller 430 displays a user interface screen and/or graphic user interface screen (or a screen generated by the user interface screen and/or graphic user interface screen) on the display unit 420. Subsequently, the controller 430 detects (or senses) a first touch input to the display unit (touch screen) 420.

Figure 5A:
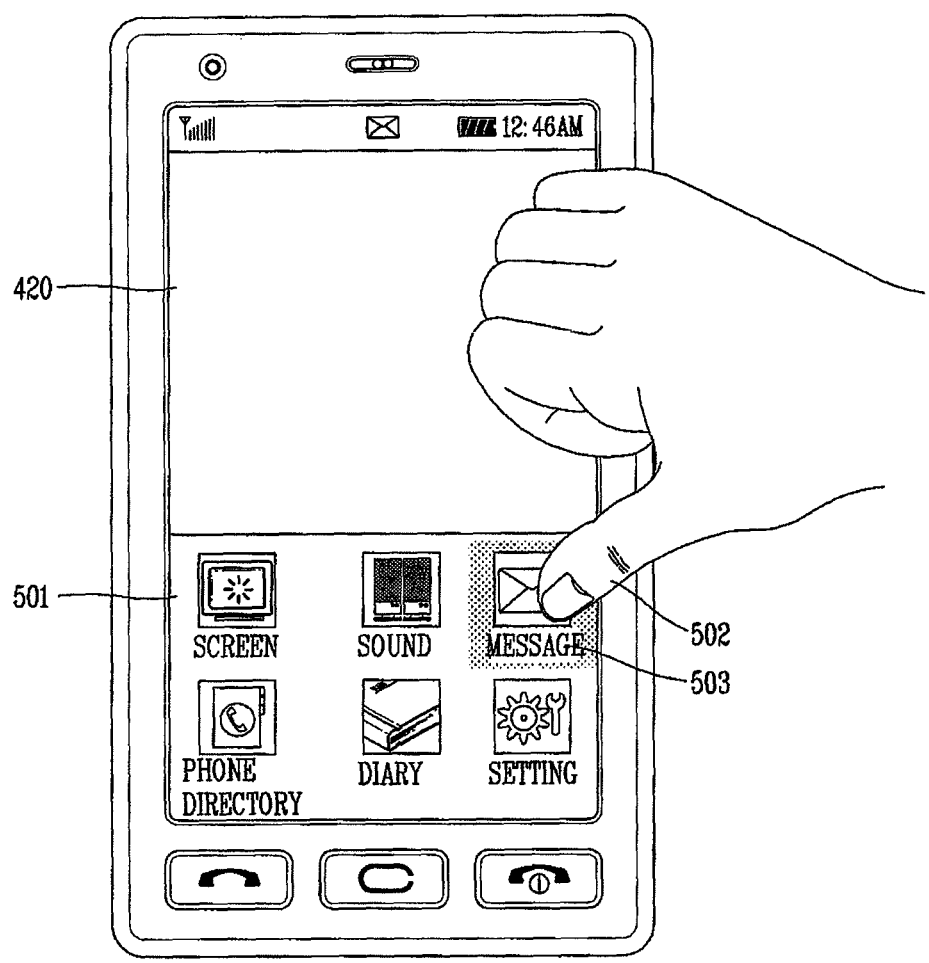
FIGS. 5(a) through 5(f) are views of a screen of a function execution apparatus according to an embodiment of the present invention.

For example, the controller 430, as illustrated in FIG. 5(a), can detect a first touch 502 input for selecting any one (in the figure, selecting a menu icon labeled "message") of various optional functions 501 (including background screen, menu screen, and the like) displayed on the display unit 420. Also, once touched, the function (or menu) can be displayed in an activated state 503 (e.g., bold, highlight, alternative color, etc.) In addition, a touch on the display unit 420 may be either one of proximity touch and contact touch (S110).

Subsequently, the controller 430 detects a drag created by a second touch input that is touched on the display unit 420 while maintaining the first touch input. At this time, the first touch input may be maintained as it is or the touched state may be deactivated after detecting the second touch input (S120).

Figure 5B:
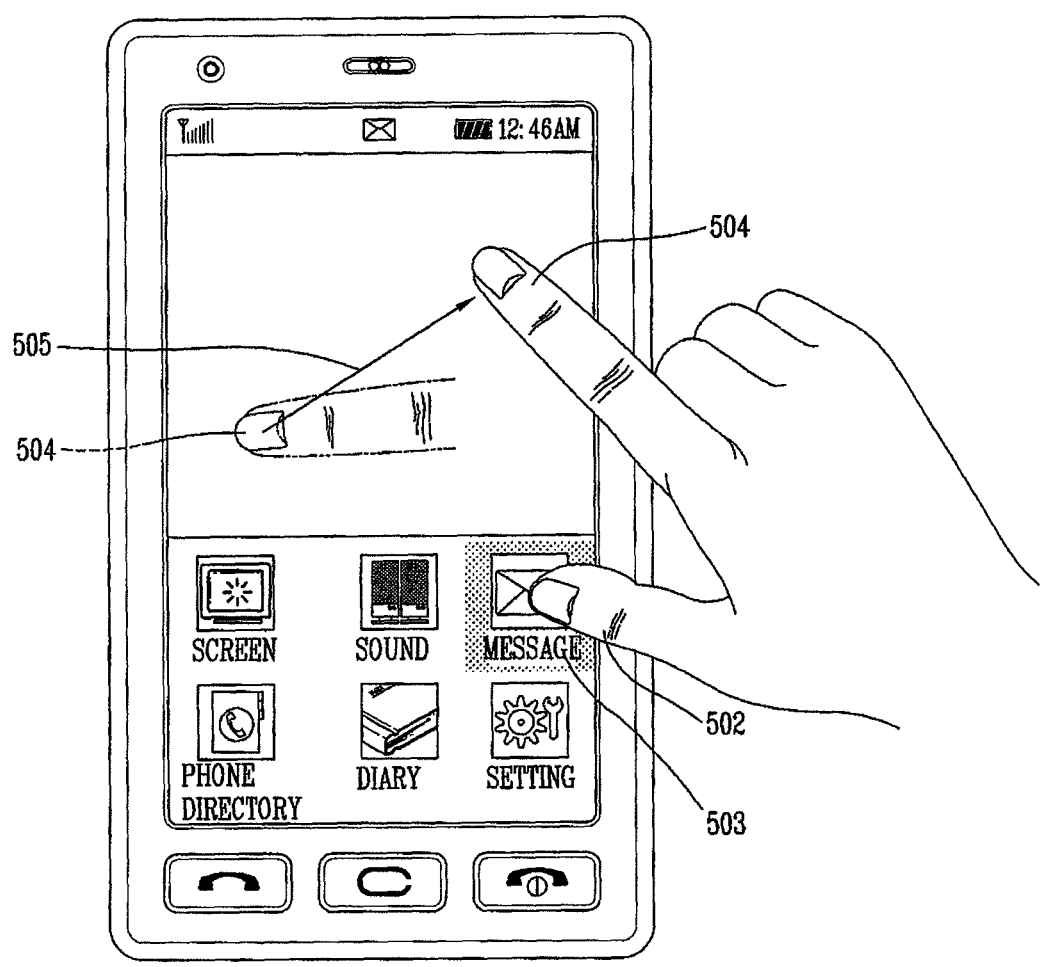

For example, as illustrated in FIG. 5(b), the controller 430 can detect a drag 504 by a second touch input on the display unit 420 while maintaining the first touch input 502. Here, the drag is detected in a window separate from an area where the optional functions are displayed.

In addition, when detecting a drag created by the second touch input, the controller 430 detects the length, moving direction 505, and the like, all together, of a trace created by the drag (S120).

Subsequently, the controller 430 displays at least one or more sub-functions corresponding to the function selected by the first touch input (S130). The one or more sub-functions may be displayed in a predetermined order (or, in a randomized order) on a trace created by the detected drag.

Figure 5C:
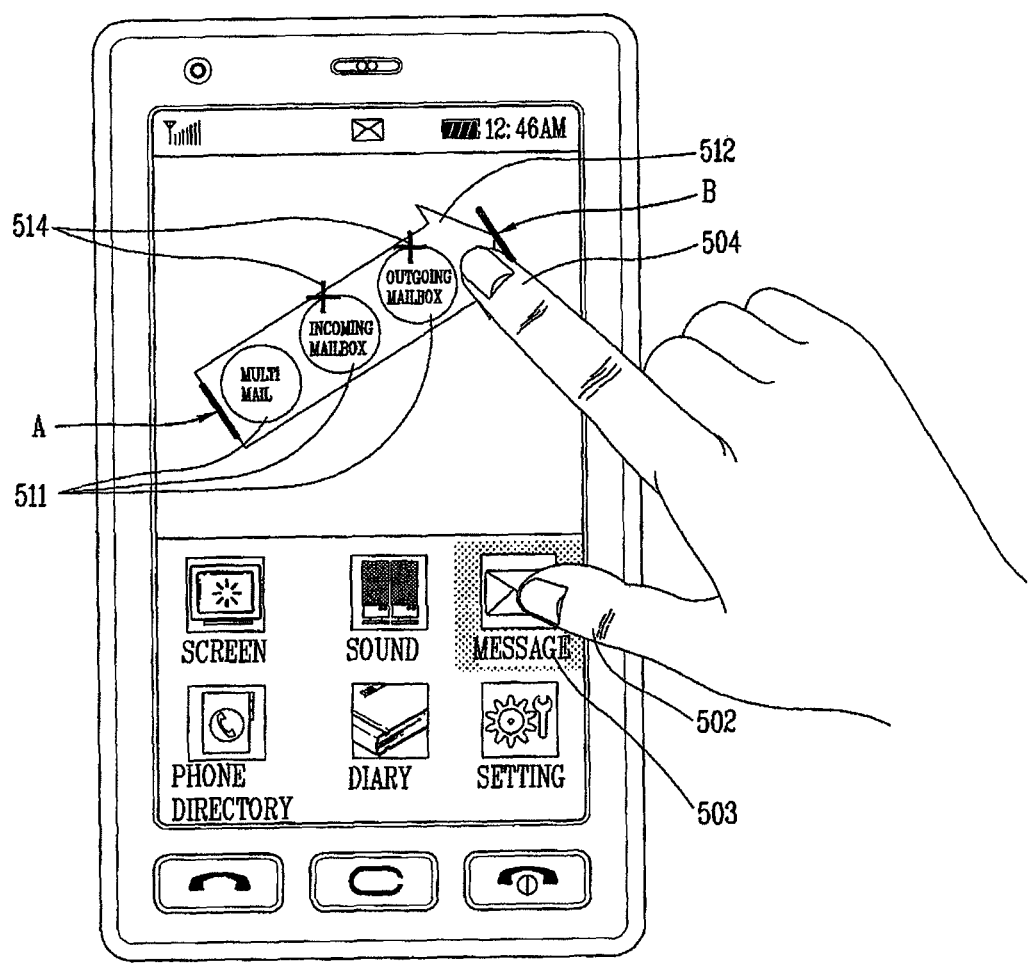

For example, as illustrated in FIG. 5(c), when the number of sub-functions (sub-menu screens or sub-menu functions) corresponding to the function (menu "message") selected by the first touch input is seven (including multi-mail, incoming mailbox, outgoing mailbox, email, emoticon, message use record, call, and the like), the controller 430 displays the sub-functions 511 on a trace of the detected drag. Here, the number of sub-functions that are displayed correspond to a trace length of the detected drag. In this example, the sub-functions are displayed in a preset order. In other words, the controller 430 displays 511 one or more sub-functions included in the menu "message" on a trace from a position (position "A") inputted by the second touch to an end position (position "B") created by a drag of the second touch. Even though there are 7 sub-functions in this example, only 3 are displayed due to the length of the detected drag.

At this time, when there are non-displayed sub-functions among the sub-functions displayed on a trace created by the drag (for example, when only three are displayed among the seven sub-functions, and remaining four are not displayed), as illustrated in FIG. 5(c), then a preset first identifier 512 may be displayed on part of a trace created by the drag (for example, an arrow head on an end portion of the moving direction of the trace) to indicate that there exist non-displayed sub-functions. At this time, the preset first identifier may be an icon (including a plus shape ("+"), an arrow shape ("→"), a button shape, a scroll shape, or the like), an emoticon, a user or graphic user interface screen, and the like.

Also, when there are non-displayed sub-functions, a preset background color may be displayed on a certain region of the trace 513 created by the drag to indicate that there exist non-displayed sub-functions.

In addition, when all the sub-functions included in a function selected by the first touch input are displayed on a trace created by the drag, then a background color may be displayed with a different color from the preset background color. For example, when the preset background color is blue and all the sub-functions included in a function selected by the first touch input are displayed on a trace created by the drag, then the background color is displayed with a transparent color to indicate that all the sub-functions included in the selected function are displayed.

In such a way, various display methods will be used to distinguish a complete status from an incomplete status of displaying all the sub-functions.

When any sub-function among the sub-functions displayed on a trace created by the drag includes additional sub-functions, as illustrated in FIG. 5(c), then a preset second identifier 514 may be displayed on part of any displayed relevant sub-function to indicate that there exist additional sub-functions. At this time, the preset second identifier may be an icon (including a plus shape ("+"), an arrow shape ("→"), a button shape, a scroll shape, or the like), an emoticon, a user or graphic user interface screen, and the like.

Furthermore, when any sub-function among the sub-functions displayed on a trace created by the drag includes additional sub-functions, the any relevant sub-function may be displayed with a 3D effect, and a sub-function not including additional sub-functions may be displayed with a 2D effect.

At this time, the first touch input and the second touch input may be in a non-executed state. However, when one or more sub-functions included in a function selected by a first touch input is displayed on the display unit 420 based upon the first touch input and the second touch input, and then the first and the second touch inputs by the user are released, then the controller 430 receives any one selection of one or more sub-functions displayed on the display unit 420 and executes the selected sub-function.

For example, when the function "multimail" is selected among the sub-functions 511 as illustrated in FIG. 5(c), then the controller 430 executes the multimail function, and displays the function execution result on the display unit 420.

Figure 5D:
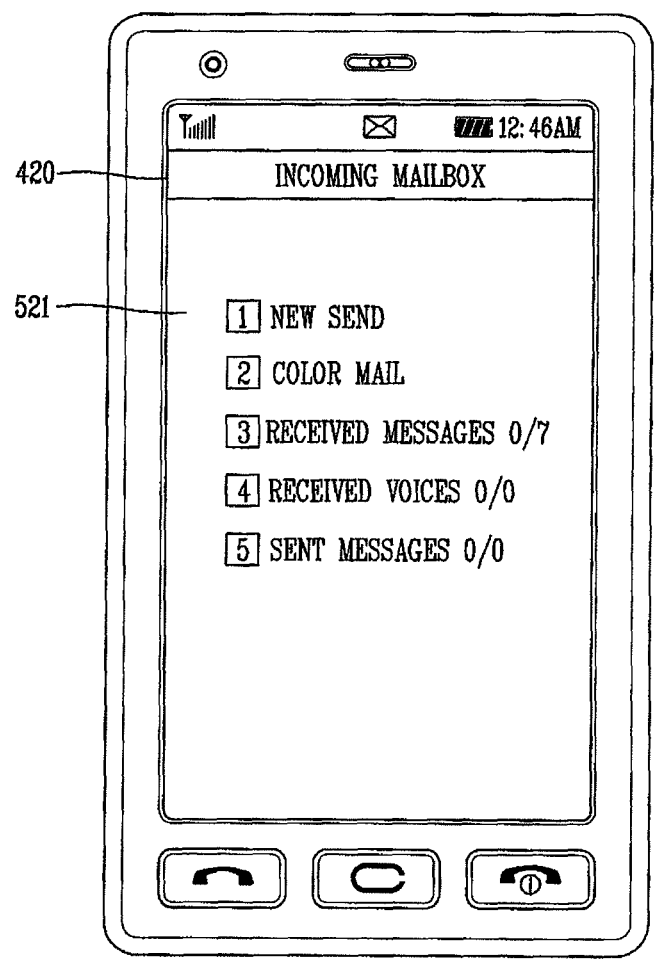

For another example, when the function "incoming mailbox" is selected among the sub-functions 511 illustrated in FIG. 5(c), then the controller 430 executes the relevant incoming mailbox function, and may display 521 additional sub-functions (new send, color mail, received messages, received voices, sent messages, and the like) included in the incoming mailbox as illustrated in FIG. 5(d) on the display unit 420.

However, while functions may be executed by releasing a touch, it is also possible for the functions/sub-functions to remain displayed and unexecuted when they are released. In this alternative, a function may executed by subsequent touch or tap to the displayed function, or by a button push. Or, non-displayed functions may be displayed by touching first identifier 512 or by a subsequent touch and drag.

Figure 5E:
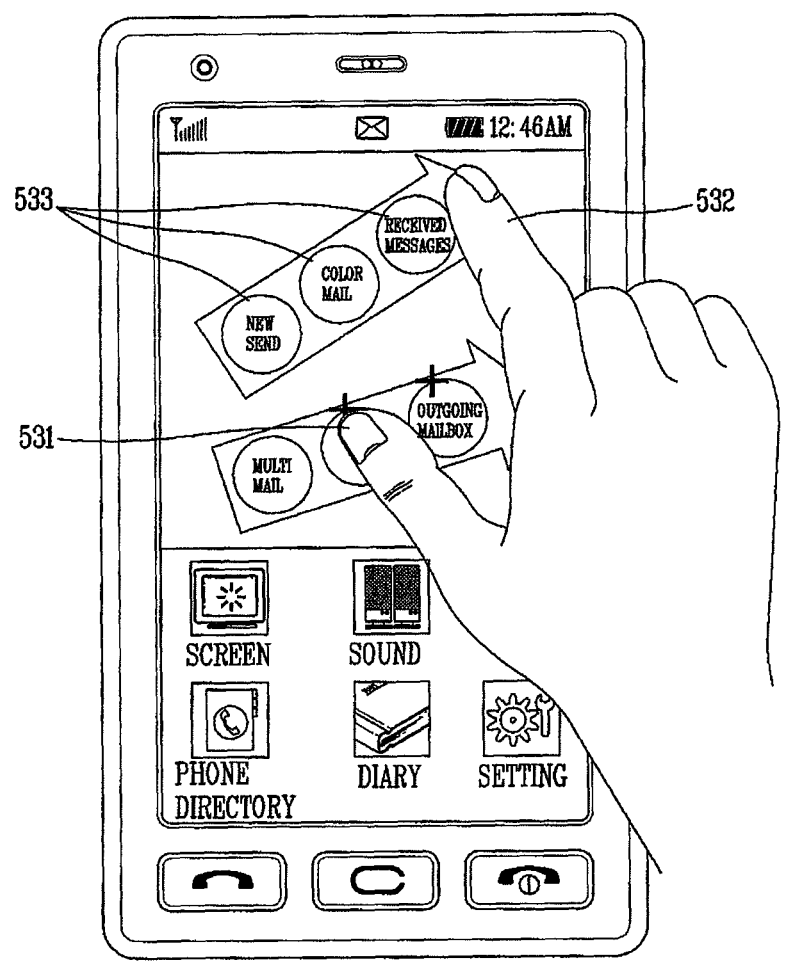

For example, as illustrated in FIG. 5(e), when the controller 430 detects a touch (or selection) 531 to the icon "+" (second identifier) 514 provided in part of the function "incoming mailbox", and a drag 532 created by a fourth touch input, the controller 430 may display 533 additional sub-functions included in the selected function "incoming mailbox" in a trace length and moving direction of the drag created by the fourth touch input in a predetermined order on the display unit 420.

Figure 5F:
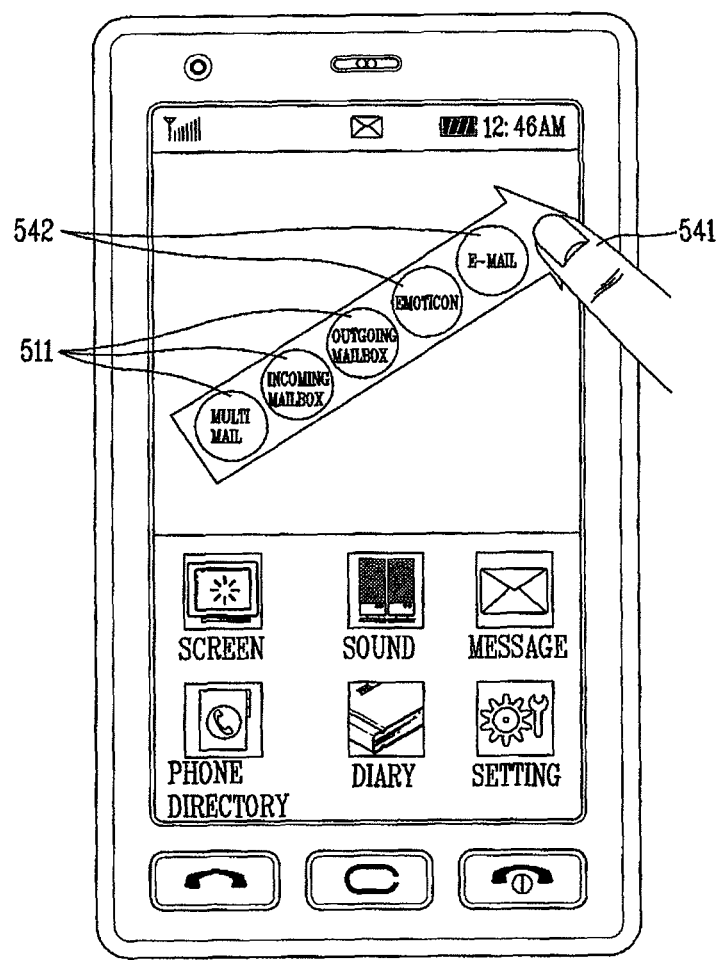

As illustrated in FIG. 5(f), when the controller 430 detects a drag 541 created by a new touch input on the first identifier 512, the controller 430 may control to display the remaining one or more non-displayed sub-functions 542 by the second touch input among one or more sub-functions included in a function selected by the first touch input in a trace length and moving direction of a drag created by the new touch input on the display unit 420 (S140). Repeated touches to first identifier 512 will allow the related sub-functions to scroll across the drag area. Alternatively, it is possible for the sub-functions to scroll without further touches (i.e., based on a timer or other predetermined stimulus).

The controller 430 determines a preset function cancellation condition at each of the steps (S110 through S140). As a result of the determination, when it corresponds to the function cancellation condition, then the controller 430 controls the device to not display the executed result at the each step on the display unit 420.

For example, when a second touch input (or, a drag created by the second touch input) is not detected within a preset first time period after detecting the first touch input, then the controller 430 controls a screen displayed on the display unit 420 to release an activated state of the relevant function touched by the first touch input.

For another example, when any one of the one or more sub-functions displayed on the display unit 420 is not selected within a preset second time period, then the controller 430 releases an activated state of the relevant function touched by the first touch input, and does not display the one or more sub-functions displayed on the display unit 420. In addition, when controlling to disappear the one or more sub-functions displayed on the display unit 420, the controller 430 may provide an effect that the one or more sub-functions seem to be sucked into an arbitrary position (for example, a starting position (position "A") of the second touch input).

For still another example, when a drag created by a touch input is detected in a direction opposite to the moving direction 505, then the controller 430 may release an activated state of the relevant function touched by the first touch input, and not display the one or more sub-functions displayed on the display unit 420. In other words, when detecting a drag created by a touch input in a direction opposite, the controller 430 may be configured to execute the function "cancellation" preset to correspond to the detected second direction and/or remove the sub-functions from the screen.

When performing the preset function "cancellation" with a drag in the second direction, it is possible to consider time, speed, or the like as well as the second direction. In other words, the controller 430 may be configured to detect a drag created by a touch input in the second direction within an arbitrary preset time period and a drag speed in the second direction, and thereby the controller 430 may execute the preset function "cancellation" when a drag speed greater than the preset speed.

Figure 6:
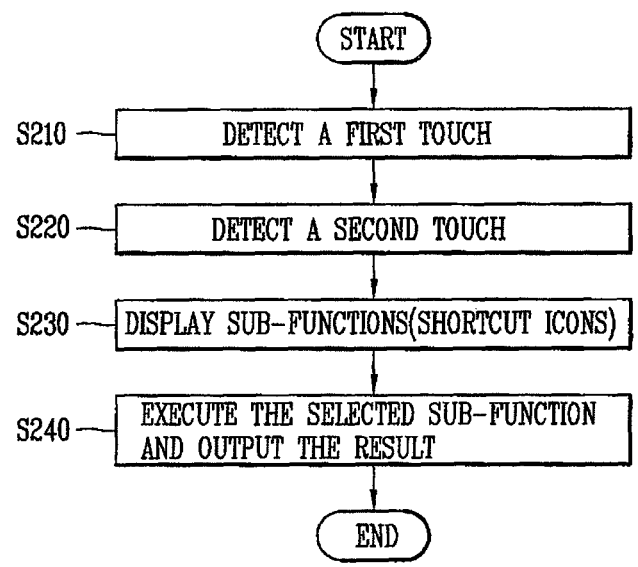
FIG. 6 is a flow chart of a function execution method according to a second embodiment of the present invention.

FIG. 6 is a flow chart illustrating a function execution method according to a second embodiment of the present invention. The second embodiment is similar to the first embodiment, except for the fact that the touches to function/menu icons are not used. Also, both the first and second embodiment may co-exist in a device. For example, an operator may choose to operate a device in accordance with the first or second embodiment via preference selection. Or, certain functions may be accessible via the first embodiment while others may be accessible via the second embodiment.

In the second embodiment, the controller 430 detects (or senses) a first touch input that is touched on the display unit (touch screen) 420.

Figure 7A:
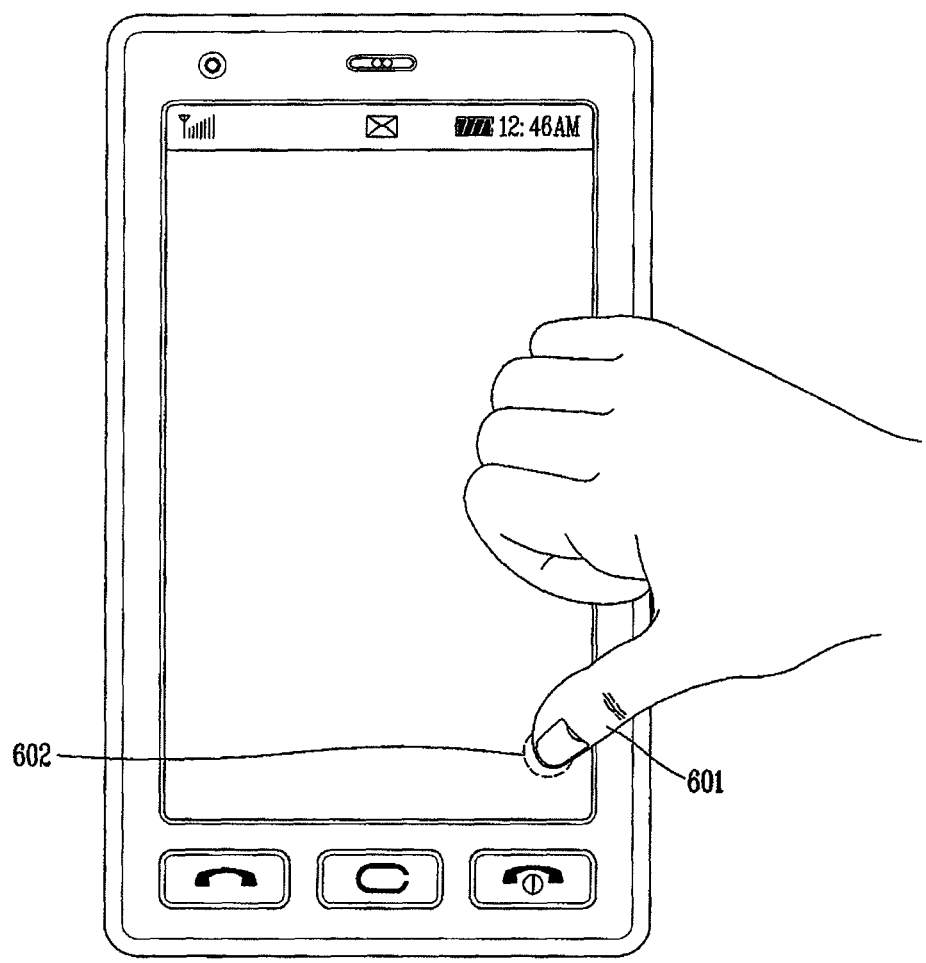
FIGS. 7(a) through 7(d) are views of a screen of a function execution apparatus according to an embodiment of the present invention.

For example, the controller 430, as illustrated in FIG. 7(a), can detect a first touch 601 input for selecting (touching) arbitrary region of the display unit 420. Also, the arbitrary region of the touched background screen (relevant function or menu) can be displayed in an activated state 602. In addition, a touch on the display unit 420 may be either one of proximity touch and contact touch (S210).

Subsequently, the controller 430 detects a drag created by a second touch input that is touched on the display unit 420 in a state while maintaining the first touch input. At this time, the first touch input may be maintained as it is or the touched state may be deactivated after detecting the second touch input.

Figure 7B:
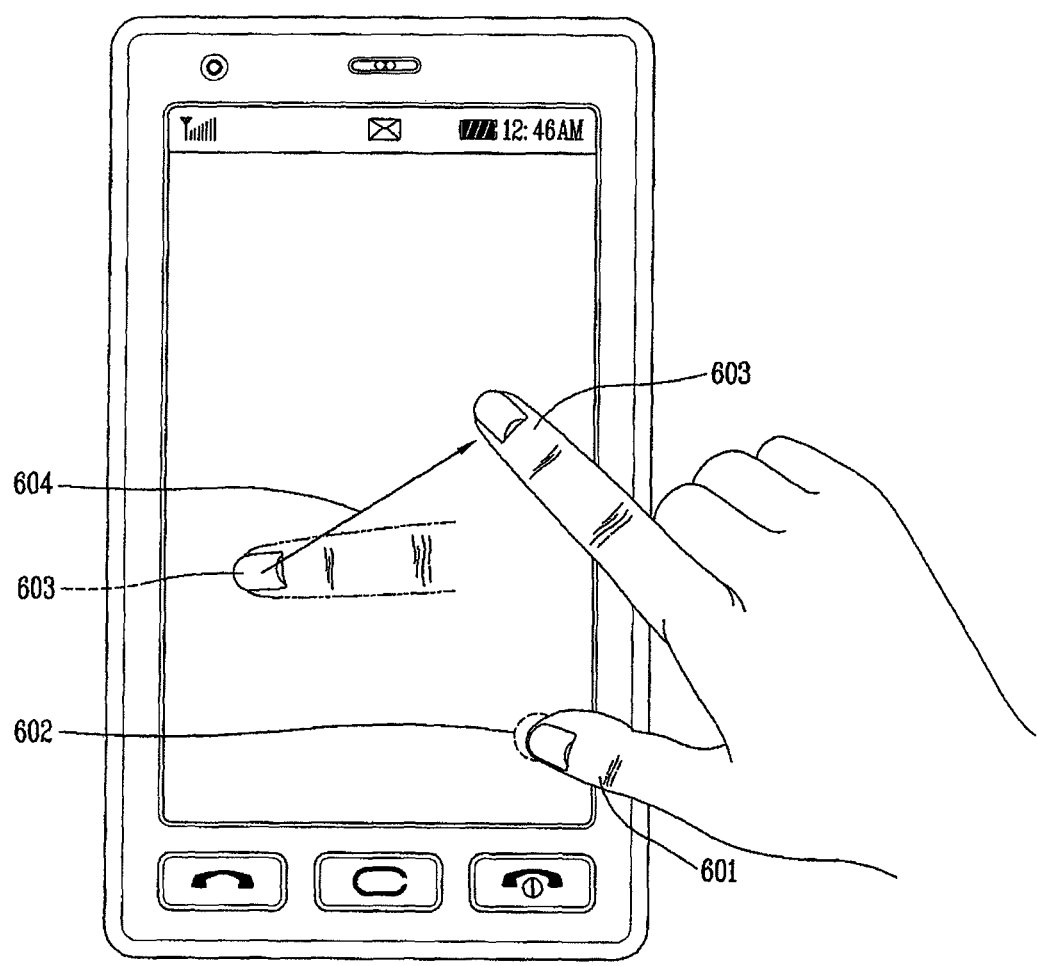

For example, as illustrated in FIG. 7(b), the controller 430 can detect a drag 603 by a second touch input that is touched on the display unit 420 in a state while maintaining the first touch input 601.

In addition, when detecting a drag created by the second touch input, the controller 430 can detect the length, moving direction 604, and the like, all together, of a trace created by the drag (S220).

Subsequently, the controller 430 displays at least one or more sub-functions included in a function selected by the first touch input in a preset order (or, in a randomized order) on a trace created by the detected drag.

Figure 7C:
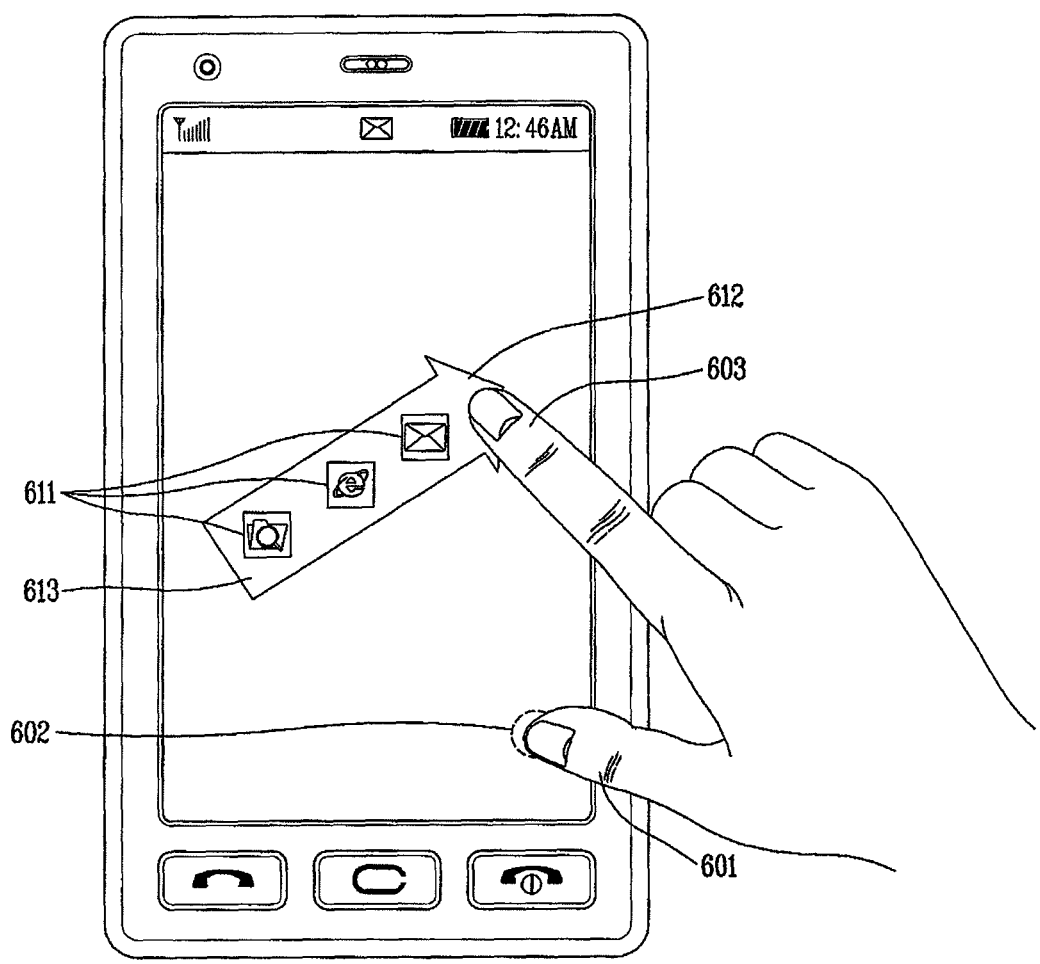

For example, as illustrated in FIG. 7(c), when the number of sub-functions included in a function (corresponding to "an arbitrary region of background screen") selected by the first touch input is five (including windows explorer, web browser, email box, memo pad, calendar, and the like), the controller 430 displays 611 the sub-functions included in the selected function on a trace of the detected drag as much as a trace length created by the detected drag in a preset order. In other words, the controller 430 displays one or more sub-functions included in the selected function from a position inputted by the second touch to an end position created by a drag of the second touch. At this time, the one or more sub-functions may be a shortcut icon, or the like, of a specific application program.

When displaying at least one or more sub-functions included in a function selected by the first touch, the controller 430 may display the one or more sub-functions on a trace created by the second touch or any preset trace (S230).

Subsequently, when any one of the displayed sub-functions is selected, then the controller 430 executes the selected sub-function, and displays the function execution result on the display unit 420.

Figure 7D:
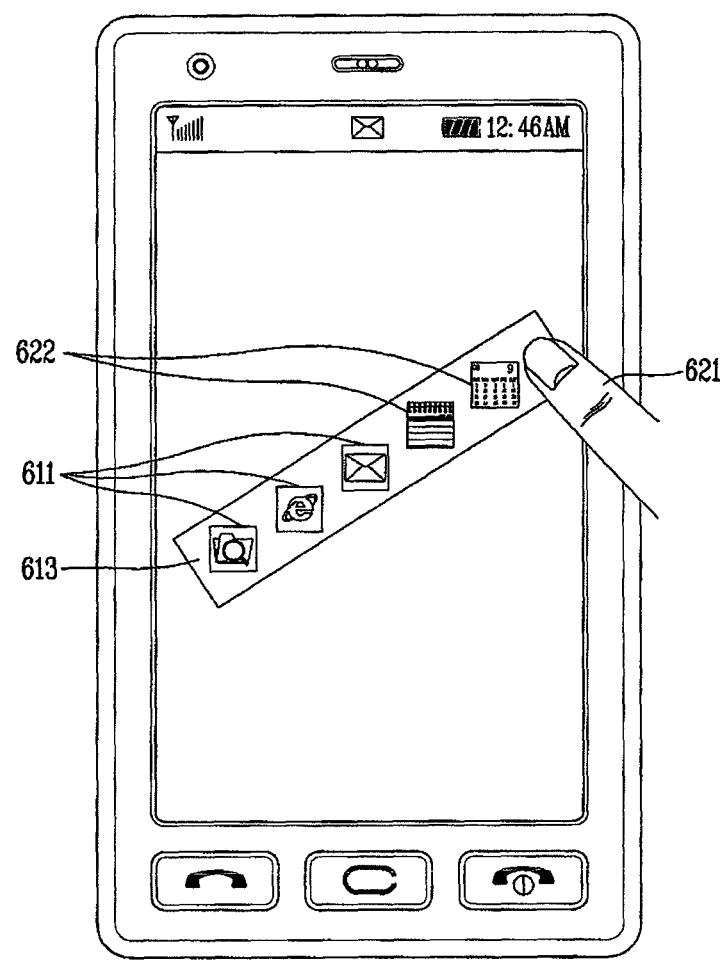

For another example, as illustrated in FIG. 7(d), when the controller 430 detects a drag 621 created by a new touch input on the first identifier 612, the controller 430 may control to display the remaining one or more non-displayed sub-functions 622 by the second touch input among one or more sub-functions included in a function selected by the first touch input in a trace length and moving direction of a drag created by the new touch input on the display unit 420.

As shown in FIG. 7(*d*), when all the sub-functions included in a function selected by the first touch input are displayed on the display unit 420, then the controller 430 may not display the first identifier 612 as illustrated in FIG. 7(*c*) (S240).

The controller 430 determines a preset function cancellation condition at each of the steps (S210 through S240). As a result of the determination, when it corresponds to the function cancellation condition, then the controller 430 controls not to display the executed result at the each step on the display unit 420.

Figure 8:
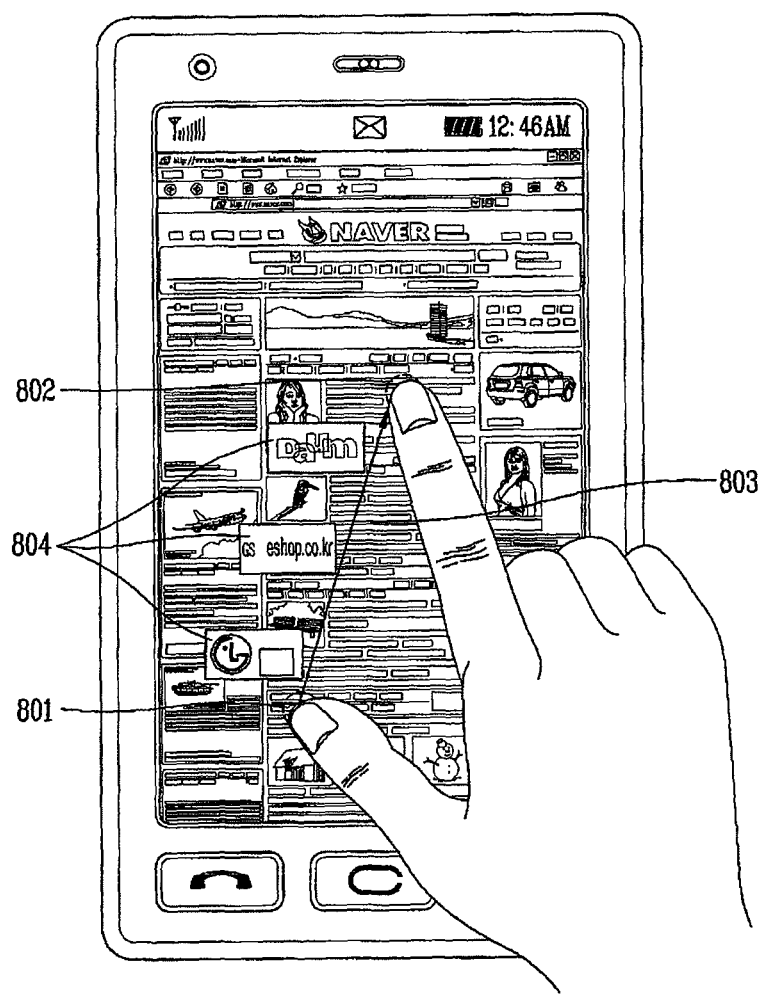
FIG. 8 is a view of a state in which a function execution method of the invention is applied to a web browser.

FIG. 8 is a view illustrating an embodiment where a function execution method of the present invention is applied to a web browser.

First, the controller 430 executes a web browser (for example, INTERNET EXPLORER) from application programs pre-stored in the storage unit 410, and displays the execution result on the display unit 420.

Subsequently, the controller 430 detects a first touch input 801 to an arbitrary region of the web browser execution screen displayed on the display unit (touch screen) 420. At this time, the touched arbitrary region may be a background screen of the web browser, texts or images with or without an embedded link to a specific document or site. In addition, a touch on the display unit 420 may be either one of proximity touch and contact touch.

Subsequently, the controller 430 detects a drag 802 created by a second touch input touched on the display unit 420 while maintaining the first touch input 801.

When a drag created by the second touch input is detected, then the controller 430 displays one or more sub-menus 804 associated with a preset function in a preset order (or, in any order) on a trace created by the drag and based upon the length, moving direction 803, and the like, of the trace created by the drag.

In one example, the sub-functions may be websites referred to in block of text/images beneath or around the drag. Alternatively, the controller 430 displays sub-functions 804 (for example, including "LG Electronics" web site, "GS Shopping Mall" web site, "DAUM" web site, and the like) included in a preset function ("Favorites") for the web browser on the trace.

Subsequently, when any one of the displayed sub-functions 804 is selected, the controller 430 executes the corresponding sub-function. In other words, when "LG Electronics" is selected among the displayed sub-functions 804, the controller 430 may execute a new web browser, and execute a link to the relevant site through the executed web browser (or, the currently executed web browser), and display the execution result on the display unit 420.

Figure 9:
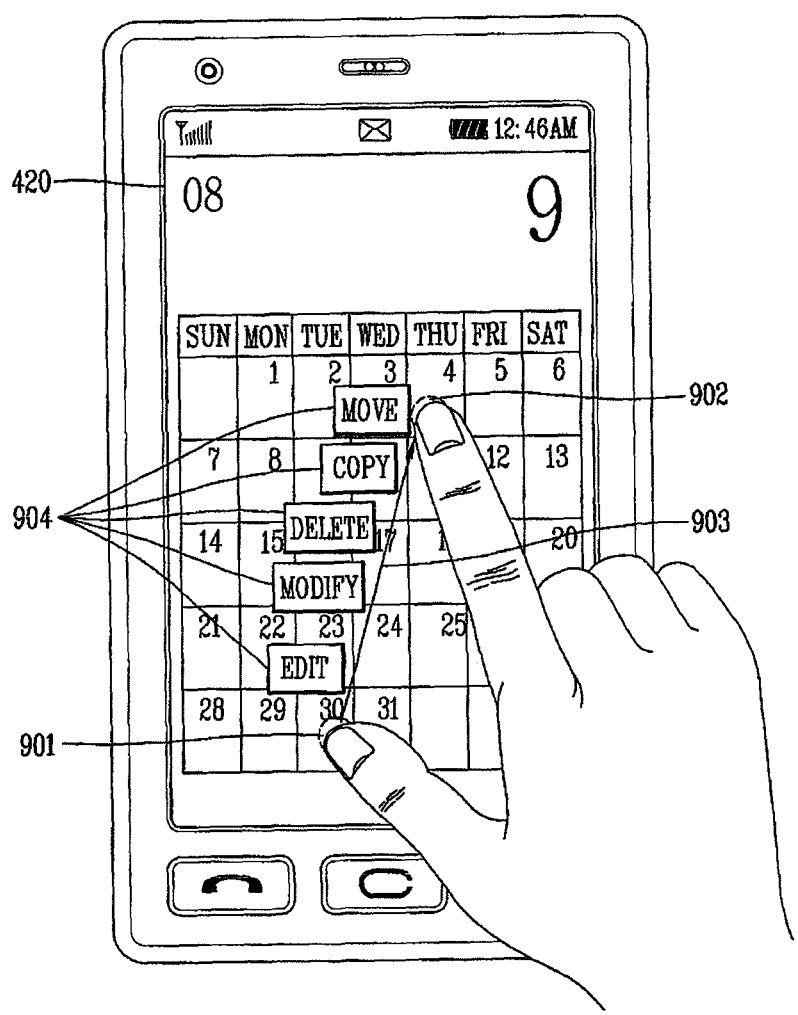
FIG. 9 is a view of a state in which a function execution method of the invention is applied to a calendar schedule.

FIG. 9 is a view illustrating a state in which a function execution method of the invention is applied to a calendar.

First, the controller 430 displays a calendar.

Subsequently, the controller 430 detects a first touch input 901 to an arbitrary region of the calendar. At this time, the touched arbitrary region may be a region associated with a calendar item for which a user desires to execute a specific function. In addition, a touch on the display unit 420 may be either one of proximity touch and contact touch.

Subsequently, the controller 430 detects a drag 902 created by a second touch input touched on the display unit 420 while maintaining the first touch input 901.

When a drag created by the second touch input is detected, then the controller 430 displays one or more menus/sub-menus 904 in a preset order (or, in any order) on a trace created by the drag based upon the length, moving direction 903, and the like, of a trace created by the drag.

In other words, the controller 430 displays the sub-functions 904 (for example, including edit, modify, delete, copy, move, and the like) associated with a preset function ("Specific Date").

Subsequently, when any one of the displayed sub-functions 904 is selected, the controller 430 executes the corresponding sub-function. In other words, when "September 30" is selected by the first touch input, and the "edit" function is selected by the second touch input, the controller 430 may display an editable screen for "September 30" on the display unit 420.

Subsequently, the controller 430 may be configured to receive and store the updated schedule content.

It will be apparent to those skilled in this art that various changes and modifications may be made thereto without departing from the gist of the present invention. Accordingly, it should be noted that the embodiments disclosed in the present invention are only illustrative and not limitative to the spirit of the present invention, and the scope of the spirit of the invention is not limited by those embodiments. The scope protected by the present invention should be construed by the accompanying claims, and all the spirit within the equivalent scope of the invention should be construed to be included in the scope of the right of the present invention.

What is claimed is:

1. A method of controlling a mobile terminal, the method comprising:
    displaying, on a touch screen of the mobile terminal, one or more function icons associated with one or more functions;
    receiving a first touch input applied to a specific function icon among the one or more function icons;
    receiving a second touch input applied to the touch screen along a first direction while the first touch input is maintained;
    displaying, on a region corresponding to a touch trace of the second touch input, one or more sub function icons corresponding to one or more sub functions related to a specific function of the specific function icon, in response to the second touch input applied while the first touch input is maintained,
    wherein the displaying of the one or more sub function icons is maintained though the first touch input and the second touch input are released such that one of the one or more sub function icons is selected by a third touch input, and
    wherein the one or more sub function icons disappear from the touch screen in response to a fourth touch input applied to the touch screen along a second direction opposite to the first direction.

2. The method of claim 1, wherein the first touch input or the third touch input comprises a contact touch or a proximity touch.

3. The method of claim 1, wherein the second touch input is applied to a random position of the touch screen.

4. The method of claim 1, wherein an execution screen corresponding to the one of the one or more sub function icons is displayed in response to the third touch input.

5. The method of claim 1, wherein when the one of the one or more sub function icons displayed on the touch screen is not selected within a preset time period, an activated state of the first touch input is released.

6. The method of claim 5, wherein when the one of the one or more sub function icons displayed on the touch screen is not selected within a preset time period, the one or more sub function icons are is no longer displayed on the touch screen.

7. A mobile terminal, comprising:

a touch screen; and a controller configured to:

display, on the touch screen of the mobile terminal, one or more function icons associated with one or more functions;

receive a first touch input applied to a specific function icon among the one or more function icons;

receive a second touch input applied to the touch screen along a first direction while the first touch input is maintained; and display, on a region corresponding to a touch trace of the second touch input, one or more sub function icons corresponding to one or more sub functions related to a specific function of the specific function icon, in response to the second touch input applied while the first touch input is maintained, wherein the displaying of the one or more sub function icons is maintained though the first touch input and the second touch input are released such that one of the one or more sub function icons is selected by a third touch input, and wherein the one or more sub function icons disappear from the touch screen in response to a fourth touch input applied to the touch screen along a second direction opposite to the first direction.

8. The terminal of claim 7, wherein the first touch input or the third touch input comprises a contact touch or a proximity touch.

9. The terminal of claim 7, wherein the second touch input is applied to a random position of the touch screen.

10. The terminal of claim 7, wherein an execution screen corresponding to the one of the one or more sub function icons is displayed in response to the third touch input.

11. The terminal of claim 7, wherein when the one of the one or more sub function icons displayed on the touch screen is not selected within a preset time period, the controller is configured to release an activated state of the first touch input.

12. The terminal of claim 11, wherein when the one of the one or more sub function icons displayed on the touch screen is not selected within a preset time period, the one of the one or more sub functions are no longer displayed on the touch screen.

* * * * *